United States Patent [19]

Pustell

[11] Patent Number: 4,499,330
[45] Date of Patent: Feb. 12, 1985

[54] ANTI-VIBRATION SUPPORT FOR THERMOCOUPLE TIP

[75] Inventor: Robert A. Pustell, Andover, Mass.

[73] Assignee: General Electric Company, Schenectady, N.Y.

[21] Appl. No.: 564,668

[22] Filed: Dec. 23, 1983

[51] Int. Cl.³ .............................................. H01L 35/02
[52] U.S. Cl. .................................. 136/230; 136/242; 374/208
[58] Field of Search ............... 136/230, 231, 232, 233, 136/234, 242; 374/208

[56] References Cited

U.S. PATENT DOCUMENTS

| 3,007,990 | 11/1961 | Ihnat | 136/230 |
| 3,013,097 | 12/1961 | Fritts et al. | 136/232 |
| 3,263,502 | 8/1966 | Springfield | 136/230 |
| 3,283,580 | 11/1966 | Nanigian et al. | 136/230 |
| 4,162,175 | 7/1979 | Salt et al. | 136/230 |
| 4,411,859 | 10/1983 | Smith et al. | 136/230 |

FOREIGN PATENT DOCUMENTS 1814503  3/1957  United Kingdom ............... 136/230

Primary Examiner—Ben R. Padgett
Assistant Examiner—T. J. Wallen
Attorney, Agent, or Firm—I. David Blumenfeld

[57] ABSTRACT

An anti-vibration support for the unsupported tip of a thermocouple probe consists of a resilient, compressible, multi-sided sleeve. The sleeve is positioned between the outer surface of the probe and the inner wall of the protective housing. The sides of the resilient sleeve are deformed on insertion between the probe and the wall forcing the edges formed by the intersection of the sides of sleeve firmly into contact with the wall. This multi-point or multi-line contact between the sleeve and the wall firmly secures the tip end of the probe against vibration.

4 Claims, 4 Drawing Figures

ANTI-VIBRATION SUPPORT FOR THERMOCOUPLE TIP

This invention relates to a support for a thermocouple temperature sensing device and, more particularly, a support to prevent vibration induced movement of the free or tip end of the probe.

A thermocouple is a temperature sensing device containing one or more junctions of two dissimilar metals which produce an electrical potential that is a measure of the temperature of the medium to which the junctions are exposed. The junction or junctions are usually mounted in a protective casing with the combination forming the thermocouple probe. One important application of such thermocouple probes is to measure the temperature of the exhaust gas stream of turbines or jet engines for safety and control purposes. The thermocouple probe is, in turn, positioned in a further cylindrical housing which is spaced from and surrounds the thermocouple to provide additional protection. U.S. Pat. No. 3,007,990 which is assigned to General Electric Company, the assignee of the instant application, illustrates such a thermocouple construction.

The unsupported end, or tip, of the thermocouple probe contains one of the thermocouple junctions and extends beyond the end of the protective cyclindrical housing. In a jet engine the unsupported end or tip of the thermocouple probe is subject to severe vibration which may cause substantial movement of the tip end so that it strikes the end of the housing. In time, the vibration induced contact will damage or destroy the thermocouple probe.

Applicant has found that the free or tip end of a thermocouple probe may be firmly supported against vibration by positioning a resilient, compressible, multi-sided sleeve support element between the outer diameter of the probe and the inner diameter of the protective housing surrounding the probe. The multi-sided sleeve consists of a plurality of flat or cord shaped sides. The edges formed by the intersection sides contact the inner wall of the housing When the sleeve is inserted between the probe and the inner wall of the housing, the sides of the sleeve are deformed. Deformation of the sides maintains multi-point—but not continuous—contact with the inner wall thus holding the thermocouple probe firmly in position under severe vibratory conditions. If desired, the sleeve may have an axial slit, or opening in order to accommodate any tolerance variations in the inner and outer diameters of the housing and the probe respectively.

It is, therefore, a principal objective of this invention to provide a thermocouple probe in which the free or tip end of the thermocouple is firmly supported against vibration.

Another objective of the invention is to provide a protected thermocouple probe structure in which a vibration support member is positioned between the free end of the thermocouple probe and the inner diameter of the housing surrounding the thermocouple probe.

Other objectives and advantages of the invention will become apparent as the description thereof proceeds.

The various objectives and advantages of the invention are realized in one form thereof by positioning a multi-sided, resilient and, hence, compressible sleeve member between the tip end of the thermocouple probe and the inner surface of the protective housing surrounding the probe. The resilient element is deformed by insertion between the housing and the probe thereby supporting the probe tip firmly against vibration.

The novel features which are believed to be characteristic of this invention are set forth with particularity in the appended claims, the invention itself, however, both as to its organization and method of operation, together with further objectives and advantages thereof, may best be understood by reference to the following description taken in connection with the accompanying drawings in which:

Figure 1:
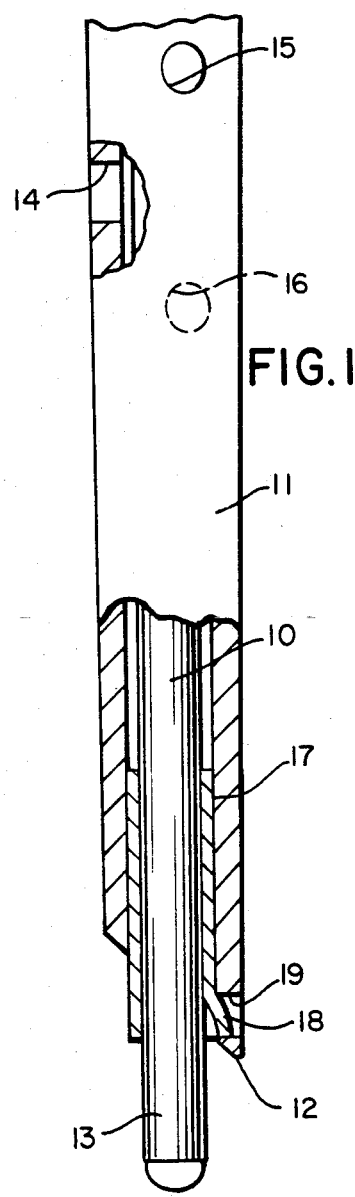
FIG. 1 is a partially broken away view of a thermocouple probe and its protective housing.

FIG. 1 illustrates a thermocouple assembly according to the instant invention and includes a thermocouple probe 10 positioned in a protective housing 11. The mounting flanges or other means for securing the probe assembly to the casing of a jet engine or a gas turbine are, for the sake of simplicity, not shown but may take any one of a number of well known forms. The casing 12 of thermocouple probe 10 has a rounded closed end or tip 13 which extends beyond housing 11. Thermocouple casing 12 is made of stainless steel or any other suitable metal. The thermocouple probe contains a plurality of thermocouple junctions, not shown, one of which is axially located so as to be within protective housing 11 and the other of which is located in tip 13 and is thus directly in the heated fluid stream. Pairs of dissimilar conductors extend through the bore of case 12 and are joined at their ends to form thermocouple junctions.

The wire pairs are, as pointed out previously, of dissimilar metals and are preferably chromelalumel combinations such as those sold by the Hoskins Corporation of Detroit, Mich. under the ANSI type K designation. The chromel wire is typically 90% nickel with chrome and other trace elements, whereas the alumel is a 98% nickel with aluminum, silicon and other trace elements as the remaining 2% of the metal. The thermocouple conductors in casing 11 are insulated from each other and from the case by a suitable insulating core consisting of a powdered insulating material such as magnesium oxide, MgO, or other metal oxides such as aluminum oxide, $Al_2O_3$ or these oxides mixed with glass powder.

In order to permit passage of the gaseous medium into the vicinity of the thermocouple junction inside of the housing, a plurality of cimcumferentially and axially displaced aspiration holes 14, 15 and 16, extend through housing 11 in the vicinity of the upper thermocouple junction to allow gas flow past the buried junction.

A resilient, compressible, multi-sided vibration support sleeve 17 is positioned at the lower end of housing 11 between the probe and the inner wall of housing 11. A projection or dimple 18 is positioned at the lower end of the vibration supporting sleeve, and fits into a retaining hole 19 in housing 11. Dimple 18 prevents axial motion of the sleeve with respect to the housing and the probe. While such a retaining hole and dimple or projection on the sleeve is often desirable, the invention is not limited thereto since in many instances the compression of the sleeve between the inner wall of the protective housing and the probe provides enough frictional contact between the multiple edges of the sleeve and the wall to prevent axial movement of the sleeve.

Figure 2:
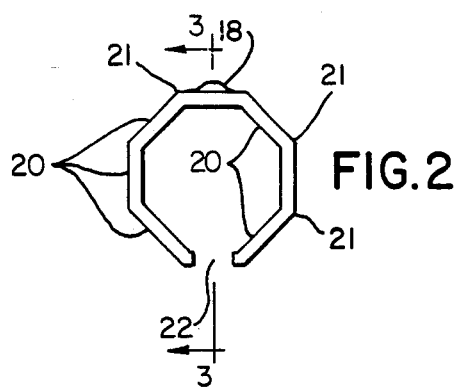
FIG. 2 is an end view of the unassembled vibration support sleeve shown in assembled form of FIG. 1.

FIG. 2 illustrates an end view of the resilient, compressible, multi-sided sleeve 17 in the unassembled form. Sleeve 17 consists of seven (7) flat sides or cords 20. The intersection of sides 20 form a plurality of edges 21 which will establish contact with the inner wall of protective housing 17 when the sleeve is inserted between the probe and the housing. Deformation of the sides when the sleeve is inserted forces the edges against the wall. The side dimensions are such with respect to the probe OD and housing ID that the sides, while deformed, do not contact the wall, thus maintaining a multi-edge or point contact. This permits the housing and sleeve to move axially relative to the probe during engine "lite-off" and "shut-down" when the housing reaches temperature faster than probe and expands axially or cools faster than the probe and contracts. If there were solid contact, the effect of many cycles of "lite-off and shut-down" would buckle the probe. Sleeve 17 is shown with an opening or axial slot 22. Providing such an axial slot accommodates any variations in the tolerances of the probe outer wall and inner wall of the protective housing. Locking Dimple 18 is located at one end of the sleeve.

Figure 3:
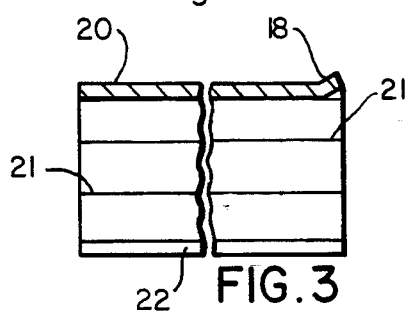
FIG. 3 is a sectional view of the support sleeve taken along the lines 3—3 of FIG. 2.

As shown in FIG. 3, dimple 18 is formed at one end of the sleeve and, is utilized as a retainer element which, in conjunction with the retainer hole 19 in the housing, prevents any axial movement of the sleeve with respect to housing as well as helping to locate the sleeve axially within the probe and housing arrangement.

Figure 4:
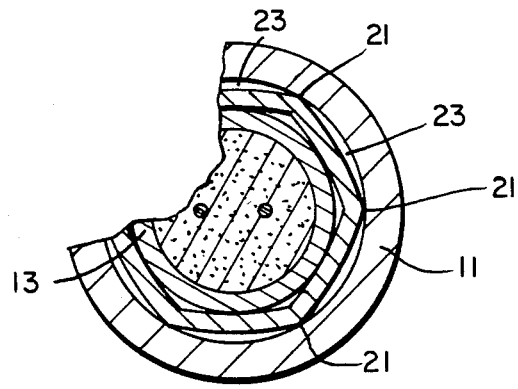
FIG. 4 shows a portion of the thermocouple-sleeve assembly in sectional form.

FIG. 4 shows a partial section of the probe, housing and sleeve in the assembled state. As can be seen, probe 11 is positioned on the interior of sleeve 17 and contacts sides 20 deforming them outwardly and forcing edges 21 firmly against the inner surface of housing 11. Although deformed, the now arcuate sides 20 do not contact the inner wall of housing 11, leaving a small space 23 between sides 20 and the housing. In the assembled state, the sleeve establishes multi-point or, actually, multi-edge contact with the wall in an axial direction. This, as pointed out previously, allows relative movement of the housing in an axial direction during "lite-off and shut-down" of the engine when the housing expands and contracts earlier than the probe itself, while firmly securing the probe against lateral movement.

It will be apparent from the foregoing description, that a simple but effective arrangement has been provided for supporting the free or unsupported tip of a thermocouple probe against vibration by securely locating it within the end of the protective housing surrounding the probe.

While the instant invention has been shown with certain preferred embodiments thereof, the invention is by no means limited thereto since other modifications of the instrumentalities employed may be made and still fall within the scope of the invention. It is contemplated by the appended claims to cover any such modifications that fall within the true scope and spirit of this invention.

What is claimed as new and desired to be secured by Letters Patent of the United States is:

1. A temperature sensing probe assembly comprising:
   a. a temperature sensing probe positioned in a protective housing, the tip portion of said probe extending beyond said housing,
   b. anti-vibration support means for the tip portion of said probe comprising at least one multi-sided sleeve positioned between the interior of said housing and the exterior of the probe whereby the sides are deformed in the assembly to make multi-point but discontinuous contact with the interior of the housing.

2. The temperature sensing probe assembly according to claim 1 wherein said sides are flat and represent the cords of a circle, the diameter of said circle being substantially equal to the inner diameter of said housing.

3. The temperature sensing probe assembly according to claim 1 wherein said sleeve is open.

4. The temperature sensing probe assembly according to claim 1 wherein said sleeve has an opening extending the length of the sleeve.

* * * * *